A. E. TRENTOWSKY.
COOKING UTENSIL.
APPLICATION FILED MAY 14, 1912.
1,065,191.
Patented June 17, 1913.
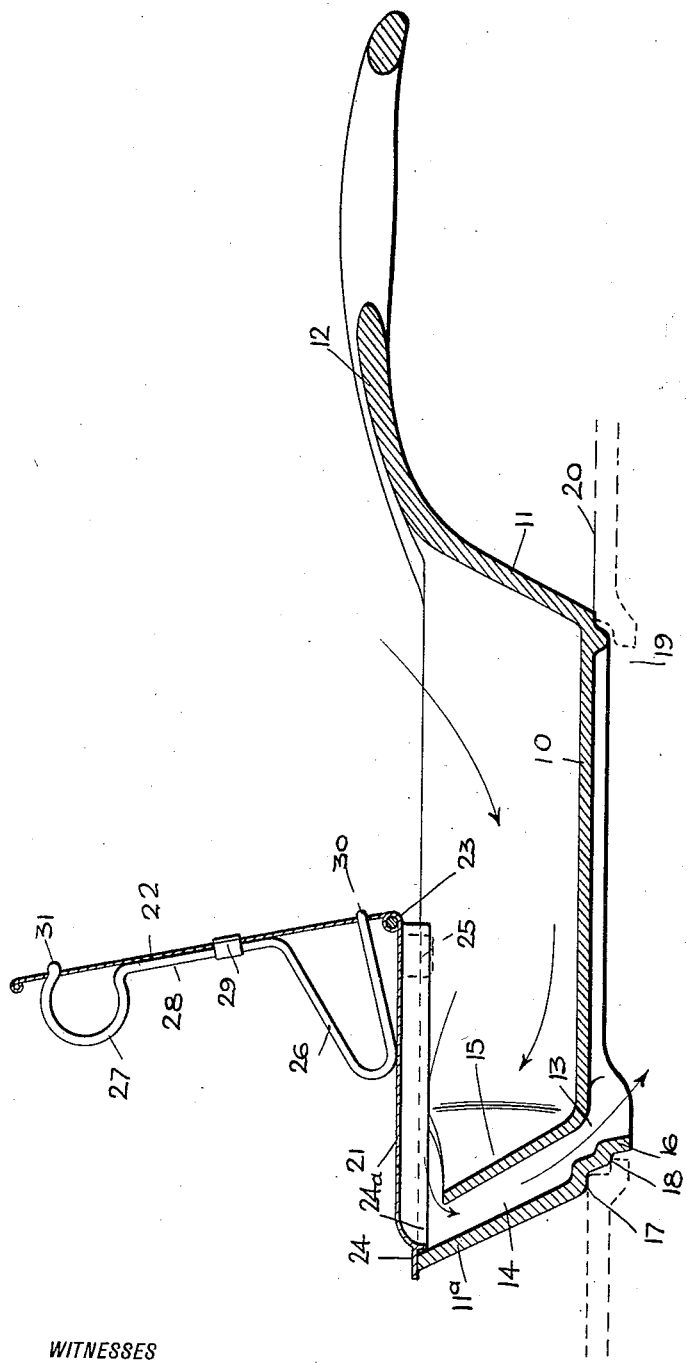
WITNESSES
INVENTOR
Albert E. Trentowsky
BY
ATTORNEYS

UNITED STATES PATENT OFFICE.

ALBERT EDWIN TRENTOWSKY, OF ST. JOHN, NEW BRUNSWICK, CANADA.

COOKING UTENSIL.

1,065,191. Specification of Letters Patent. Patented June 17, 1913.

Application filed May 14, 1912. Serial No. 697,248.

*To all whom it may concern:*

Be it known that I, ALBERT E. TRENTOWSKY, a subject of the King of Great Britain, and a resident of St. John, in the Province of New Brunswick and Dominion of Canada, have invented a new and Improved Cooking Utensil, of which the following is a full, clear, and exact description.

My invention relates to that class of cooking utensils designed for use on the top of a stove or range, and to be set over the opening upon the removal of a lid.

An object of the invention is to provide a cooking utensil of the general character referred to, adapted particularly for frying and stewing, and having an improved construction whereby the odors arising from the food being cooked will escape through the bottom of the pan to the interior of the stove and thence to the chimney.

A further object of the invention is to provide an improved cover co-acting with the special arrangement of the compartment or outlet passage for the odors, gases, etc.

The invention will be more particularly explained in the specific description hereinafter to be given.

Reference is to be had to the accompanying drawings forming a part of this specification, in which the figure represents a longitudinal vertical section of a cooking utensil embodying my invention, showing the hinged section of the cover raised.

The utensil preferably has the general form of a frying pan, comprising a bottom 10, flaring sides 11, and a handle 12. The bottom of the pan is formed with an outlet opening 13 contiguous to the front portion of the pan, and a passage or compartment 14 is formed complementary to the opening 13 leading thereto. The outer wall of the chamber or compartment 14 is formed by the front portion 11ᵃ of the flaring side of the utensil, while the inner wall is formed by a partition 15, which preferably ranges in a curved line transversely of the utensil, a proper distance from the front wall 11ᵃ. The partition 15 terminates at the end short of the upper edge of the utensil, for the ready passage of the gases, odors, etc., from the main portion of the utensil over the partition 15 to the passage or compartment 14 and thence to and through the outlet 13. The front portion 11ᵃ of the utensil is extended downward beyond the bottom 10, as at 16, and said downward extension is formed with offset portions providing shoulders 17, 18, the arrangement being such that said downwardly projecting and shouldered portion constitutes a gage for setting the utensil in the opening, as 19, of the stove top, indicated by dotted lines at 20, so that by grasping the handle and bringing the shoulder extension 16 against the wall of the opening 19, the utensil is readily positioned.

In connection with the described utensil, I employ an improved cover comprising sections 21, 22, hinged together as at 23, so that the section 22 may be swung upward, or lowered to the closed position. The front edge of the section 21 of the cover extends outward in the form of a horizontal flange 24 to rest on the upper edge of the pan, and is provided with an approximately vertical flange 24ᵃ to be received within the pan. Adjacent to the hinge 23, the section 21 of the cover is formed at each side with depending lips 25, which extend down below the top edge of the utensil and prevent lateral displacement of the cover. The hinged section 22 may be provided with a member forming a stop 26 and a lifting loop 27, said loop and stop being preferably formed of a single piece of wire and united by a longitudinally extending connecting member 23, which is secured to the top of the hinged section 22 of the cover, as by a keeper 29. The stop 26 has its terminal 30 preferably extending through a hole in the section 22, to the under side, from which terminal the stop extends upward and is returned into approximately U-shape to a union with the longitudinal member 28, the arrangement being such that when the cover section 22 is thrown upward, the stop 26 contacts with the top of the section 21 when the said hinged section passes over its center of movement. Similarly, the free end 31 of the lifting loop or finger loop 27 is passed through a hole in the hinge section 22 near the rear edge, and may be soldered or bent against the under side of the said hinge section.

Having thus described my invention, I claim as new and desire to secure by Letters Patent:

1. A cooking utensil for stove-top cooking, comprising a container having a passage extending from near the top of the utensil through the bottom thereof, and a removable cover consisting of hinged sections, one of which extends from a side of the pan over and beyond the mentioned passage, and spaced vertically from the top of said passage, the remaining section of the cover completing the closure of the utensil and being movable on the hinge of the sections to an open position, the first mentioned cover section having means around its edge to prevent escape of smoke and fumes.

2. A cooking utensil for stove-top cooking, comprising a pan provided with a lateral handle at the back, and a cover, the pan at the opposite side from the handle having a passage extending from near the top of the pan, through the bottom thereof, the inner wall of the passage being formed by a curved partition terminating short of the top edge of the pan and being integral with the bottom of the pan and integral with the opposite sides of the pan, and the outer wall of the passage being formed by the adjacent portion of the pan body, said outer wall extending at the bottom of the pan below the remaining side wall and below the bottom of the pan and the inner wall of the passage, and the lower end of the said outer wall of the passage having a plurality of steps below the remainder of the pan, and the cover of the pan being formed in two hinged sections, one section being located above the mentioned passage and having a lateral edge flange, and a depending flange fitting within the pan, the other hinge section being unflanged and being movable on its hinge to a raised position.

3. A cooking utensil, comprising a pan having a passage extending from near the top of the pan downwardly through the bottom thereof, said passage being formed by an inner partition and the adjacent side wall of the pan, and a cover formed of two hinged sections, one section being located above the passage and having a lateral edge flange, and a depending flange fitting within the pan, the other section being movable on its hinge to a raised position.

In testimony whereof, I have signed my name to this specification, in the presence of two subscribing witnesses.

ALBERT EDWIN TRENTOWSKY.

Witnesses:
WM. B. WALLACE,
HENRY S. CULVER.

Copies of this patent may be obtained for five cents each, by addressing the "Commissioner of Patents, Washington, D. C."